Sept. 10, 1968 NIKOLAUS PICHLER 3,401,300
ALSO KNOWN AS NICOLAUS R. PICHLER
PIN CUSHION CORRECTION CIRCUIT
Filed July 1, 1965
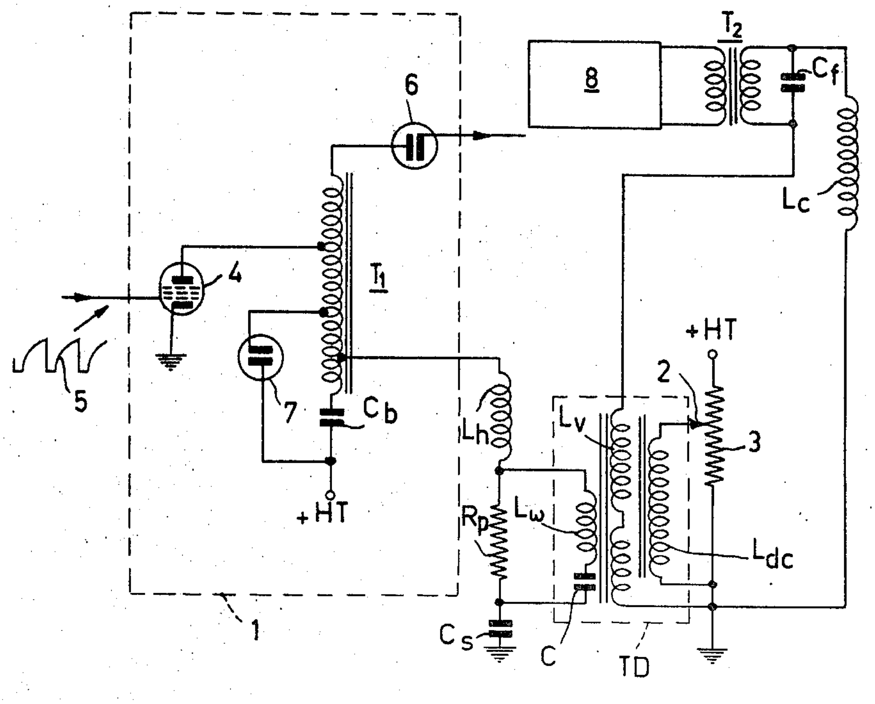
INVENTOR.
NIKOLAUS PICHLER
BY
Frank R. Trifari
AGENT United States Patent Office 3,401,300
Patented Sept. 10, 1968

3,401,300
PIN CUSHION CORRECTION CIRCUIT

Nikolaus Pichler, also known as Nicolaus R. Pichler, Munich, Germany, assignor to North American Philips Company, Inc., New York, N.Y., a corporation of Delaware Filed July 1, 1965, Ser. No. 468,757
Claims priority, application Netherlands, July 4, 1964, 6407634
5 Claims. (Cl. 315—24)

ABSTRACT OF THE DISCLOSURE

A pin cushion correction circuit for the vertical deflection circuit of cathode ray tubes. The horizontal deflecting sawtooth current is integrated by a series tuned combination of a capacitor and primary winding of a saturable reactor in parallel with a resistor. The secondary winding is included in the vertical deflection circuit. The series tuned combination is tuned somewhat below the frequency of the horizontal deflection circuit.

This invention relates to magnetic deflection circuits for the electron beam in a cathode-ray tube. More particularly, to a deflection circuit having means for correcting raster distortion in cathode ray tubes. Deflection circuits of this type generally comprise a first source for producing a sawtooth current through a first deflection coil for deflecting the electron beam in a first direction and a second source for producing a sawtooth current through a second deflection coil for deflecting the electron beam in a second direction substantially at right angles to the first direction. The deflection circuit also includes means for integrating the sawtooth current produced by the first-mentioned source that comprises the parallel combination of an ohmic resistor and the primary winding of a premagnetized transductor. The secondary winding of the transductor is included in the circuit of the second deflection coil for correcting deflection errors in said second direction.

Such a circuit is known from the publication, "Experimental Colour Television Circuits," issued in June 1963 by Philips Electronic Market Development Department, more particularly, section D, page D–12, FIGURE 10.

To obtain a satisfactory parabolic current, the sawtooth current produced by the first source must be integrated. This is possible if the integration is effected, as has been done in said FIGURE 10, by means of an inductor L which is the primary winding of the transductor and across which a sawtooth voltage is developed. However, the sawtooth voltage across this primary winding is developed via a resistor R connected parallel to it. The sawtooth current supplied by the first source flows, however, almost solely through the resistor R. Due to the integrating action of the inductor L, a parabolic current thus flows through the primary winding.

The assumption that the sawtooth current flows almost solely through the resistor R is true only if the impedance of the inductor L of the primary winding is high relative to the value of resistor R. Since the repetition frequency of the current flowing through the inductor is determined by the particular deflection system, for example, a 625 or 405 line television system, the repetition frequency is determined and the condition $\omega L \gg R$ (where $\omega$ is determined by said repetition frequency) can be fulfilled only if the inductance L is high relative to the resistor R.

The ideal case is approximated if $L/R$ is indefinite. This may be achieved by giving the resistance R a zero value at a finite value of L. In this case it is impossible to develop a sawtooth voltage across the inductor so that a parabolic current also cannot flow through said inductor.

The reverse case, namely giving the inductance L an infinite value at a finite value of R, is impracticable.

In practice, this means that a certain $L/R$ relationship must be chosen so that an optimum integration is obtained, and still a sufficiently large parabolic current flows through the inductor.

On the other hand, there is no freedom in the choice of the inductance since a certain number of turns of the primary winding is associated with a certain value of the parabolic current. In other words, for a given correction required, the number of ampere turns is to be regarded as constant. A certain inductance L is associated with a certain number of turns and, in order to achieve the required current flow in said inductor, a choice of the $L/R$ relationship is necessary.

However, a certain power is dissipated in the resistor R and this power is proportional to $i^2R$.

To reduce this dissipated power as much as possible, the circuit according to the invention features a capacitor connected in series with the primary winding. The resulting series-circuit comprising the primary winding and the capacitor, is tuned to a frequency which closely approximates, but is lower than, the repetition frequency of the sawtooth current produced by the first-mentioned source.

In fact, due to the resulting circuit being tuned, the apparent inductance of the series-circuit, which behaves inductively, is lower than the circuit inductance without the addition of the capacitor. If the inductance L becomes lower, however, the resistance R can also be decreased since the $L/R$ relationship must remain the same. Consequently, the dissipated power $i^2R$ is also reduced.

With so-called North-South correction, that is to say, correction of the vertical deflection by means of a signal derived from the horizontal deflection stage, a reduced value of the added resistor R affords a second advantage. In fact, the production of the horizontal sawtooth current is actually based on the periodic connection, if desired through a transformer, of a constant voltage across a substantially pure inductor, in this case the deflection coil, in which event a substantial linear sawtooth current commences to flow through this deflection coil. The greater the deviation from a pure inductance by the addition of a resistor, the greater the distortion of the sawtooth current. Thus the lower the value of the resistor R of the integrating circuit, which is connected in series with the horizontal deflection coil, the lower the distortion of the horizontal sawtooth current.

In order that the invention may be readily carried into effect, one possible embodiment of the invention for so-called North-South correction will now be described in detail, by way of example, with reference to the accompanying diagrammatic drawing.

The figure shows a generator 1 which causes the sawtooth current to flow through a horizontal deflection coil $L_h$. To this end, the deflection coil $L_h$ is connected to a tap on a winding of a line output transformer $T_l$. A resistor $R_p$ and a capacitor $C_s$, which blocks the direct current, are connected in series with the deflection coil $L_h$. Since a substantially sawtooth current must flow through the deflection coil $L_h$, a sawtooth current will also flow through the resistor $R_p$, resulting in a sawtooth voltage appearing across this resistor.

The series-combination of a winding $L\omega$ and a capacitor C is connected in parallel with the resistor $R_p$. The winding $L\omega$ is the primary or control winding of a transductor TD. The secondary winding $L_v$ of the transductor is connected in series with a vertical deflection coil $L_c$ in order to obtain the required modulation of the vertical deflection current. The operation of the transductor TD has been described in the aforementioned publication "Experimental Colour Television Circuits" so that its operation need not be explained further. It is mentioned only that a substantially parabolic current must flow through the primary winding $L\omega$ in order to obtain the desired correction of the barrel-shaped or cushion-shaped distortion of the image formed on the television display tube. The desired premagnetisation of the transductor TD is obtained by means of a tertiary winding $L_{dc}$ through which a direct current flows. The current is adjusted by means of the tap 2 on a potentiometer 3.

If a sawtooth voltge is developed across an inductor, this sawtooth voltage will be integrated, as is well-known, so that a parabolic current flows through the inductor, which is just what is necessary. However, if the capacitor C connected in series in accordance with the invention is not present, then in view of the number of ampere turns required for correction at the same number of turns of the winding $L\omega$, the actual inductance thereof will be higher than the apparent inductance of the series-circuit formed by the capacitor C and the winding $L\omega$. Therefore without a capacitor, the resistor $R_p$ must also have a higher value, whereby the disadvantages referred to in the preamble occur.

In order that the series-circuit of the winding $L\omega$ and the capacitor C behaves inductively, it must be tuned to a frequency which is lower than the repetition frequency of the sawtooth current determined by the generator 1. That is to say, the resonance of said series-circuit must be lower than the repetition frequency of the sawtooth current. In this connection it must be considered that the addition of the capacitor causes a certain distortion of the parabolic current. In practice, a god compromise is obtained if the resonance frequency of the series-circuit is ⅔ of the repetition frequency of the sawtooth current.

The figure also shows an output tube 4 of the horizontal deflection circuit. This tube is controlled by means of a signal 5 applied to its control grid. The anode circuit of the tube 4 includes the line output transformer $T_1$. A high voltage diode 6 is connected to one end of this transformer. To the other end of the transformer a capacitor $C_b$, associated with the series-booster diode circuit, is connected. A series-booster diode 7 is connected to a tap on the auto-transformer T1. The series-combination of the horizontal deflection coil $L_h$, the resistor $R_p$ and the capacitor $C_s$ is connected between another tapa on transformer T1 and the ground terminal of a supply voltage source+HT.

A generator 8 supplies the vertical sawtooth voltage to the primary winding of a vertical output transformer T2. The series-combination of the coils $L_c$ and $L_v$ is connected to the secondary winding of said transformer.

Furthermore, it will be evident that, although the coil $L_v$ in the present example is connected in series with the deflection coil $L_c$ in which the sawtooth current has to be corrected, it is also possible to connect the secondary winding $L_v$ in parallel with the relevent deflection coil. It is then necessary, however, to make allowance for the formation of an actual parallel circuit so that it may be necessary to include further impedances in the circuit in order to prevent the parabolic current flowing through this parallel circuit from reaching that portion of the circuit through which the pure sawtooth current has to flow.

It will also be evident that, although vacuum tubes are shown in the preferred embodiment, the circuit according to the invention can operate as well with transistors and diodes of the semiconductor type.

What is claimed is:

1. A deflection circuit for the electron beam in a cathode ray tube, comprising a first deflection coil for deflecting the electron beam in a first direction, a first energy source coupled to said coil for producing a sawtooth current in said coil of a given repetition frequency, a second deflection coil for deflecting the electron beam in a second direction substantially at right angles to the first direction, a second energy source coupled to said second coil for producing a sawtooth current in said second coil, means for integrating the sawtooth current produced by the first energy source comprising, a premagnetized transductor having a primary and a secondary winding, an ohmic resistor, and means connecting said ohmic resistor and said primary winding in parallel, means connecting said secondary winding in circuit with the second deflection coil for correcting distortion of the raster in said second direction, and a capacitor connected in series with the primary winding to form a series circuit tuned to a frequency which closely approximates, but is lower than, said given sawtooth current repetition frequency.

2. A deflection circuit as claimed in claim 1 wherein said parallel connecting means is arranged to connect said ohmic resistor across the series combination of said primary winding and said capacitor, and wherein said circuit connecting means is arranged to connect said secondary winding in series with said second deflection coil.

3. A deflection circuit as claimed in claim 2 wherein said first and second energy sources comprise the horizontal and vertical deflection generators, respectively, and said first and second deflection coils comprise the horizontal and vertical deflection coils, respectively, of said cathode ray tube.

4. A deflection circuit as claimed in claim 1 wherein said capacitor is chosen so that said series circuit is tuned to a frequency that is approximately ⅔ of said given repetition frequency.

5. A deflection circuit as claimed in claim 2 further comprising means connecting said first deflection coil in series circuit with the parallel combination of said ohmic resistor connected across the series combination of the primary winding and the capacitor.

References Cited

UNITED STATES PATENTS 2,842,709 7/1958 Lufkin ------------- 315—24

RODNEY D. BENNETT, *Primary Examiner.*

RICHARD E. BERGER, *Assistant Examiner.*